United States Patent Office 2,818,378
Patented Dec. 31, 1957

2,818,378

OXIDATION OF METHYL-PYRIDINES

Hrant Isbenjian, Brooklyn, N. Y., assignor to Robert S. Aries, Rye, N. Y.

No Drawing. Application August 10, 1953
Serial No. 373,460

11 Claims. (Cl. 204—158)

This invention relates to a process for oxidizing methyl-pyridines. More particularly, it relates to a process for preparing pyridine carboxylic acids by subjecting methyl-pyridines to the action of a halogen oxidizing agent in the presence of water and under the influence of actinic radiation whereupon the methyl group is oxidized to the carboxyl function.

The pyridine carboxylic acids are valuable chemicals having a variety of uses directly and as intermediates in further syntheses. 3-pyridine carboxylic acid, sometimes referred to as niacin or nicotinic acid, has vitamin activity and finds use in the treatment of pernicious anemia, pellagra, and other physical disorders. It is also used as an intermediate in the preparation of the amide which has similar activity but which is less likely to cause undesirable side effects in sensitive patients. 4-pyridine carboxylic acid, referred to alternatively as iso-niacin or iso-nicotinic acid, is an intermediate in the synthesis of iso-nicotinic acid hydrazide, a compound characterized by its tuberculostatic activity.

Because of their importance, considerable research has been undertaken in an effort to synthesize these acids economically from readily available chemicals. As a result, several methods have been devised whereby methyl-pyridines have been oxidized to the corresponding pyridine carboxylic acids. Specifically, an aqueous solution of β-picoline hydrochloride, i. e., the hydrochloric acid salt of 3-methyl-pyridine, has been subjected to the action of molecular chlorine at 110–115° C. in the presence of actinic radiation. This method has suffered from the fact that the reaction proceeds only to the point where a 19% conversion has been reached. In an effort to increase the conversion, attention has been directed to methods for removal of the reaction products to push the reaction to completion. Two processes have been devised for this purpose, one involving the neutralization of by-product HCl and the other involving the removal of a portion of the reaction mass, separation of the nicotinic acid, and recycling of the unreacted β-picoline hydrochloride. It has been found, however, that in the former process subsequent conversions do not proceed as far as the initial conversion and an upper limit of conversion exists falling far short of complete reaction. The latter process suffers from the fact that there is a build-up of HCl in the reactor which apparently slows down further conversion.

It is therefore an object of this invention to provide an improved process for the synthesis of pyridine carboxylic acids which overcomes the shortcomings of the prior art processes.

It is a further object of this invention to provide an economical synthesis of pyridine carboxylic acids adapted to large scale manufacture.

Another object is to provide a process resulting in increased conversions, increased yields, and decreased loss of reactants due to decomposition.

Other objects and advantages will become apparent from the description of the invention which follows.

According to the present invention, a methyl-pyridine is dissolved in water and subjected to the action of a molecular halogen in the presence of actinic light. A constant boiling mixture of the hydrogen halide formed in the reaction and of the water is distilled off pushing the reaction to completion. Preferably water is added to the reaction mass at the same rate it is distilled off so that the overall effect is removal of hydrogen halide while the reaction mass maintains its fluidity. Based on the charge of methyl-pyridine, conversions of about 70% result with little or no decomposition of unreacted charge.

Specifically, Table I gives the data pertaining to the water-hydrogen halide azeotropes at atmospheric pressure.

TABLE I

*Maximum boiling-point azeotropes*

| Hydrogen Halide | Mole Percent Water | Temperature, °C. |
|---|---|---|
| Hydrogen fluoride | 65.4 | 120 |
| Hydrogen chloride | 88.9 | 110 |
| Hydrogen bromide | 83.1 | 126 |
| Hydrogen iodide | 84.3 | 127 |

Considering the process in greater detail, oxidation of the methyl-pyridine will produce the corresponding pyridine carboxylic acid, e. g., 3-methyl-pyridine (β-picoline) will produce 3-pyridine carboxylic acid (nicotinic acid). Methyl-pyridines having other rings fused thereto such as quinaldine (2-methyl-quinoline or 2-methyl-[5,6-benzo-1-pyridine) will likewise react to form the corresponding carboxyl-containing derivative (2-carboxy-quinoline or 2-carboxy-[5,6-benzo-1-pyridine). Compounds containing a plurality of methyl substituents will react to form compounds containing corresponding carboxy groups, e. g., 2,5-dimethyl-pyridine produces 2,5-dicarboxy-pyridine.

Since the methyl-pyridines are more soluble in the form of salts, they are preferably dissolved in aqueous acid. Any of the halogens may be utilized as components of the dissolving acid or in the molecular state as the oxidizing agent. Furthermore, the halogens for each of these steps may be different. Since use of fluorine and hydrofluoric acid requires special precautions and special equipment, and since iodine and hydroiodic acid are far slower in reaction, the use of chlorine and bromine and their respective acids with hydrogen are generally preferred. Chlorine and hydrochloric acid are most suitable because of their cost, reactivity, and lower boiling points.

For further illustration, reference will be had to the use of β-picoline, chlorine, and hydrochloric acid. The β-picoline may be dissolved in water and neutralized with hydrochloric acid, or both may be added to water simultaneously with stirring, or the β-picoline may be dissolved directly in the requisite amount of dilute hydrochloric acid.

Temperatures ranging from 100–120° C. are generally employed although temperatures somewhat higher or lower may be used. A preferred range from the standpoints of reaction speed and decreased by-product formation lies between 105° C. and 110° C.

Although atmospheric pressure is preferred, this may also be varied somewhat. Variations in the pressures will produce corresponding variations in the temperature necessary for the distillation and the use of atmospheric pressure will permit distillation of the azeotrope to be effected at the preferred temperatures.

The actinic light necessary to promote the reaction may be supplied by lights outside the vessel which must therefore be constructed of materials through which the radiation can pass. Preferably, however, the vessel is constructed of materials conventional for industrial manufacture such as steel and coated ware and the source of actinic radiation, such as an ultra-violet lamp, is located within the reaction vessel, possibly submerged in the reaction mass.

The distillation may be effected continuously or intermittently and preferably the water removed is returned or an equivalent amount of water is added during the course of the distillation. The distillate may be employed for dissolving a subsequent batch of β-picoline prior to its conversion.

Where intermittent distillation is utilized, the solution is chlorinated followed by the addition of water and distillation of the HCl-water azeotrope. The cycle is repeated until the rate of HCl formation as determined from the amount distilled becomes constant. The cycles may vary considerably in length of time but cycles wherein each alternate stage lasts about one hour have proven satisfactory. About thirty cycles covering a period of about 60 hours was found to produce conversion of about 70%.

The temperature during the chlorination may be different from that of the distillation step and each may be selected to produce optimum results for the respective stages. Lower temperatures during the chlorination permit the dissolution of greater quantities of chlorine. Increased temperatures during distillation accelerate removal of HCl and increase the likelihood of reaction of the remaining traces of chlorine.

As a practical consideration, the nicotinic acid formed is less soluble than the β-picoline charged and some of it may precipitate out as formed tending thereby to clog inlet lines. This may be remedied by using larger quantities of water initially or by introducing the make-up water continuously even during the chlorination step. Excesses of water beyond that amount necessary to hydrolyze the intermediates to nicotinic acid have not been found to have any substantial effect on the reaction, so this expedient of flushing away accumulated solids may be practiced without fear of detrimental or adverse effect.

Upon substantial completion of the conversion, i. e., when the rate of HCl formation becomes substantially constant, the reaction mass may be cooled to precipitate the nicotinic acid. The nicotinic acid is then separated from the liquid by filtering and then purified. The residual liquid is made alkaline and the unused β-picoline is recovered by distillation.

As an alternative to the above-outlined process, the reaction may be effected continuously, withdrawing a portion of the reaction mass either continuously or intermittently, separating the components, recycling unreacted β-picoline, and recovering nicotinic acid as previously described. At the same time, additional β-picoline will be added continuously along with chlorine and water.

The specific method of recovering the nicotinic acid from the reaction mass or a portion of it does not constitute the subject matter of the present invention and any of the methods heretofore known may be employed.

The following example is furnished merely to illustrate the practice of the invention, but numerous changes and modifications may be made without departing from the spirit and scope of this invention.

Example

Into a 250 gallon kettle provided with a source of actinic light (ultra-violet ray tubes) 420 pounds of 37% hydrochloric acid are charged followed by 372 pounds of β-picoline (molar ratio HCl:β-picoline of 1.06:1). The mass is heated to 110–115° C. and 80 pounds of chlorine are introduced over a period of an hour. About 7 gallons of water are added and the contents are permitted to distill. About 10 to 15 gallons of dilute HCl distill off in an hour, water being added at about the same rate. The distillation is terminated and the vessel returned to reflux, repeating the cycles of chlorination and distillation. After six cycles when solid formation begins, the make-up water is added continuously through both stages. After 60 hours the reaction is terminated.

The reaction mass is permitted to cool to precipitate the nicotinic acid hydrochloride, leaving the unreacted β-picoline in solution. The precipitate is filtered off, washed with acetone, and permitted to dry in contact with air. The air dried precipitate is stirred into a small volume of water and the pH adjusted to about 3.6 with caustic soda. The solution is brought to a boil, decolorized with charcoal, and permitted to cool slowly. 340 pounds of purified nicotinic acid crystallize out resulting in conversion of almost 70% of the β-picoline charged.

The solution containing unreacted β-picoline hydrochloride is rendered alkaline with caustic soda and heated to a boil. Unreacted β-picoline steam distills in a state sufficiently pure to be re-used directly in subsequent conversions.

I claim:

1. A process for the oxidation of a methyl-pyridine dissolved in aqueous solution to the corresponding pyridine carboxylic acid which comprises raising the temperature of the solution, passing molecular halogen into the solution in the presence of actinic radiation, distilling off from the reaction mass an azeotrope of water and hydrogen halide formed in the reaction, and adding water to the solution during the course of the reaction.

2. A process for the oxidation of a methyl-pyridine dissolved in aqueous solution to the corresponding pyridine carboxylic acid at elevated temperature and in the presence of actinic radiation which comprises the successive steps of passing molecular halogen into the solution and distilling off from the reaction mass an azeotrope of water and hydrogen halide formed in the reaction, water being added to the reaction mass during the course of the reaction.

3. A process for the oxidation of a methyl-pyridine dissolved in aqueous hydrochloric acid to the corresponding pyridine carboxylic acid at elevated temperature and in the presence of actinic radiation which comprises passing chlorine into the solution, distilling off from the reaction mass an azeotrope of water and hydrogen chloride, and adding water to the reaction mass during the course of the reaction.

4. A process for the oxidation of a methyl-pyridine dissolved in aqueous hydrochloric acid to the corresponding pyridine carboxylic acid at a temperature of about 100–120° C. and in the presence of actinic radiation which comprises the successive steps of passing chlorine into the solution and distilling off from the reaction mass an azeotrope of water and hydrogen chloride while adding water to the reaction mass.

5. A process for the oxidation of β-picoline to nicotinic acid in aqueous hydrochloric acid, in the presence of actinic radiation, and at a temperature of 100–120° C., which comprises the successive steps of passing chlorine into the solution and distilling off from the reaction mass an azeotrope of water and hydrogen chloride while adding water to the reaction mass.

6. A process for the preparation of nicotinic acid which comprises maintaining an aqueous solution of β-picoline hydrochloride at a temperature of 105–110° C. while irradiated with actinic light, passing chlorine into the solution, distilling off from the solution an azeotrope of water and hydrogen chloride, adding water to the solution, withdrawing at least a portion of the reaction mass, and isolating nicotinic acid therefrom.

7. A process for the preparation of iso-nicotinic acid which comprises maintaining an aqueous solution of γ-picoline hydrochloride at a temperature of 100–120° C. while irradiated with actinic light, passing chlorine into the solution, distilling off from the solution an azeotrope of water and hydrogen chloride, adding water to the solution, withdrawing at least a portion of the reaction mass, and isolating isonicotinic acid therefrom.

8. A continuous process for the preparation of nicotinic acid which comprises maintaining an aqueous solution of β-picoline hydrochloride at a temperature of 100–120° C. while irradiated with actinic light, alternately passing chlorine into the solution and distilling off from the solution an azeotrope of water and hydrogen chloride, adding water to the solution in an amount substantially equal to the amount distilled off, withdrawing a portion of the reaction mass, isolating nicotinic acid therefrom, and adding additional reactant to continue the process.

9. A continuous process for the preparation of nicotinic acid which comprises maintaining an aqueous hydrochloric acid solution of β-picoline at a temperature of 100–120° C. while irradiated with actinic light, alternately passing chlorine into the solution and distilling off from the solution an azeotrope of water and hydrogen chloride, adding water to the solution in an amount substantially equal to the amount removed, withdrawing a portion of the reaction mass, isolating nicotinic acid therefrom, recovering therefrom unreacted β-picoline, and recycling the unreacted β-picoline along with fresh β-picoline to continue the process.

10. A continuous process for the preparation of nicotinic acid which comprises maintaining an aqueous hydrochloric acid solution of β-picoline at a temperature of 100–120° C. while irradiating the solution with actinic light, passing chlorine into the solution, distilling off from the solution an azeotrope of water and hydrogen chloride, adding water to the solution in an amount substantially equal to the amount removed, withdrawing a portion of the reaction mass, isolating nicotinic acid therefrom, recovering therefrom unreacted β-picoline, and recycling the unreacted β-picoline along with fresh β-picoline to continue the process.

11. A continuous process for the preparation of iso-nicotinic acid which comprises maintaining an aqueous hydrochloric acid solution of γ-picoline at a temperature of 100–120° C. while irradiating the solution with actinic light, passing chlorine into the solution, distilling off from the solution an azeotrope of water and hydrogen chloride, adding water to the solution in an amount substantially equal to the amount removed, withdrawing a portion of the reaction mass, isolating iso-nicotinic acid therefrom, recovering therefrom unreacted γ-picoline, and recyculing the unreacted γ-picoline along with fresh γ-picoline to continue the process.

References Cited in the file of this patent

UNITED STATES PATENTS

| | | |
|---|---|---|
| 2,396,457 | Cislak et al. | Mar. 12, 1946 |
| 2,522,163 | Cislak et al. | Sept. 12, 1950 |